United States Patent
Stricker-Shaver et al.

(10) Patent No.: US 12,487,339 B2
(45) Date of Patent: Dec. 2, 2025

(54) EXPANDING A DYNAMIC RANGE OF SPAD-BASED DETECTORS

(71) Applicant: Robert Bosch GmbH, Stuttgart (DE)

(72) Inventors: Daniel Stricker-Shaver, Besigheim (DE); Mathias Bachmeir, Ludwigsburg (DE); Remigius Has, Grafenau-Daetzingen (DE); Thomas Hasenohr, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 919 days.

(21) Appl. No.: 17/764,615

(22) PCT Filed: Sep. 10, 2020

(86) PCT No.: PCT/EP2020/075326
§ 371 (c)(1),
(2) Date: Mar. 29, 2022

(87) PCT Pub. No.: WO2021/073807
PCT Pub. Date: Apr. 22, 2021

(65) Prior Publication Data
US 2022/0413097 A1    Dec. 29, 2022

(30) Foreign Application Priority Data

Oct. 15, 2019 (DE) ............ 10 2019 215 835.8

(51) Int. Cl.
*G01S 7/484* (2006.01)
*G01S 7/481* (2006.01)
*G01S 7/4863* (2020.01)

(52) U.S. Cl.
CPC ............ *G01S 7/484* (2013.01); *G01S 7/4816* (2013.01); *G01S 7/4863* (2013.01)

(58) Field of Classification Search
CPC ...... G01S 7/4816; G01S 7/484; G01S 7/4861; G01S 7/4863; G01S 7/7868; G01S 17/14
See application file for complete search history.

(56) References Cited

U.S. PATENT DOCUMENTS

| | | |
|---|---|---|
| 10,348,051 B1 | 7/2019 | Shah et al. |
| 2015/0346325 A1 | 12/2015 | Giacotto et al. |

(Continued)

FOREIGN PATENT DOCUMENTS

| | | |
|---|---|---|
| CN | 103763485 A | 4/2014 |
| CN | 104198058 A | 12/2014 |

(Continued)

OTHER PUBLICATIONS

Eissa, M.H. et al. "Low-power planar complex dielectric sensor with DC readout circuit in a BiCMOS technology," 2016 IEEE MTT-S International Microwave Symposium (IMS), San Francisco, CA, USA, 2016, pp. 1-3. (Year: 2016).*

(Continued)

*Primary Examiner* — Michael A Lyons
(74) *Attorney, Agent, or Firm* — NORTON ROSE FULBRIGHT US LLP

(57) ABSTRACT

A method for operating a LIDAR device by a control unit is provided. At least one beam pulse is emitted into a sampling range by a beam source, and beams that are reflected and/or back-scattered from the sampling range are received by a detector that includes multiple single-photon avalanche diode (SPAD) cells, and converted into electrical counting pulses. The at least one beam pulse is generated with a lengthened falling intensity edge, and the detector is read out by a DC-coupled readout electronics system. Moreover, a control unit and a LIDAR device are provided.

6 Claims, 3 Drawing Sheets

(56) References Cited

U.S. PATENT DOCUMENTS

| | | | |
|---|---|---|---|
| 2017/0179173 A1 | 6/2017 | Mandai et al. | |
| 2019/0154815 A1 | 5/2019 | Oohata | |
| 2019/0250257 A1 | 8/2019 | Finkelstein et al. | |
| 2019/0302242 A1 | 10/2019 | Fenigstein et al. | |
| 2020/0025928 A1* | 1/2020 | Gaalema | H03K 17/0416 |
| 2020/0256960 A1* | 8/2020 | LaChapelle | G01S 7/4863 |

FOREIGN PATENT DOCUMENTS

| | | |
|---|---|---|
| EP | 3091271 A1 | 11/2016 |
| EP | 3173818 A1 | 5/2017 |
| EP | 3206046 A1 | 8/2017 |
| JP | 2007198911 A | 8/2007 |
| JP | 2017538281 A | 12/2017 |
| RU | 181377 U1 | 7/2018 |
| WO | 2018003227 A1 | 1/2018 |

OTHER PUBLICATIONS

International Search Report for PCT/EP2020/075326, Issued Dec. 8, 2020.

* cited by examiner

EXPANDING A DYNAMIC RANGE OF SPAD-BASED DETECTORS

FIELD

The present invention relates to a method for operating a LIDAR device by a control unit, and a LIDAR device for sampling a sampling range.

BACKGROUND INFORMATION

Automatedly operable vehicles and driving functions are becoming increasingly important in public road traffic. LIDAR sensors are often necessary for technically implementing such vehicles and driving functions. LIDAR sensors generate electromagnetic beams, for example laser beams, and utilize these beams for sampling a sampling range. Distances between the LIDAR sensor and objects in the sampling range may be ascertained based on a time-of-flight analysis.

Detectors of LIDAR sensors having a high range may be designed to be particularly insensitive to temperature and aging effects when they are made up of single-photon avalanche diode (SPAD) cells. Each macropixel of the detector is built from multiple SPA diodes or SPAD cells, and may receive incident beams from a defined solid angle range.

Due to the mode of operation of SPAD cells, a dead time must be taken into account in the design of the detector. The dead time results from the necessary time period for suppressing the avalanche current within the SPAD cell and re-increasing the voltage applied to the SPAD cell for a further detection of photons. During the dead time of the SPAD cells, a further detection of photons is not possible, and in addition it cannot be determined whether only one photon or multiple photons is/are detected during an active time of the SPAD cells.

A readout electronics system for suppressing the avalanche current within the SPAD cell is generally operated based on alternating current, as a result of which the dead time is increased and the maximum number of photons detected per time is decreased. Furthermore, conventional SPAD-based detectors have an inadequate dynamic range.

SUMMARY

An object of the present invention may be regarded as providing a method for operating a LIDAR device, and a LIDAR device having an expanded dynamic range.

This object may be achieved with the aid of the present invention. Advantageous embodiments of the present invention are disclosed herein.

According to one aspect of the present invention, a method for operating a LIDAR device by a control unit is provided. In one step, at least one beam pulse is emitted into a sampling range by a beam source.

The LIDAR device may thus be operated as a pulsed LIDAR device. Depending on the design of the LIDAR device, a beam angle of the at least one beam pulse may be varied in the vertical direction and/or horizontal direction, and a solid angle may thus be sampled.

Beams that are reflected and/or back-scattered from the sampling range are received by a detector that includes multiple SPAD cells, and converted into electrical counting pulses. The detector may thus be built from a SPAD cell array and may have a flat surface extension.

According to an example embodiment of the present invention, the at least one beam pulse is generated with a lengthened falling intensity edge, and the detector is read out by a DC-coupled readout electronics system. The falling pulse edge of the beam pulse extends over a longer period of time than a rising pulse edge of the beam pulse.

According to a further aspect of the present invention, a control unit is provided that is configured to carry out the method according to the present invention. The control unit may be integrated into the LIDAR device or designed as an external control unit.

In accordance with an example embodiment of the present invention, the evaluation electronics system may preferably be designed as an avalanche quenching circuit. By use of a DC-coupled evaluation electronics system instead of an AC-coupled evaluation electronics system, the active time of the SPAD cells may be precisely controlled and adapted to a duration of the generated or received beam pulse in order to measure a highly precise detection of an arrival time of the beam pulse. In particular, the active time during which SPAD cells are light-sensitive may be extended.

Due to a combination of a targeted control of the active time of the SPAD cells with an extended beam pulse, a longer average exposure time of the SPAD cells may be achieved, which results in a higher dynamic range of the detector. By use of the method according to the present invention, the dynamic range may be expanded to well above 1 million detectable photons during a received beam pulse.

In particular, the dynamic range of the LIDAR device may be increased in a technically simple manner by adapting the activation of the beam source and changing the evaluation electronics system of the detector.

Furthermore, due to a lengthened falling edge or intensity edge of the beam pulse by activating the beam source by the control unit, multiple beam pulses having an increasingly weaker intensity may be simulated, as a result of which the exposure of the sampling range via multiple short beam pulses, and thus the use of a particularly high-frequency beam source, may be dispensed with.

The use of SPAD cells for detecting the reflected beam pulses is particularly advantageous due to the small dimensions, the lower bias voltage and power loss, and the compactness, robustness, and reliability. In addition, SPAD cells provide a higher quantum efficiency and greater precision in detecting the arrival time of photons.

According to one exemplary embodiment of the present invention, the beam source is operated by the control unit in such a way that the at least one beam pulse is generated with an exponentially, quadratically, or linearly falling intensity edge. Based on the shape of the falling intensity edge of the generated beam pulses, a targeted simulation of a plurality of brief beam pulses emitted in succession may take place. The dynamic range of the LIDAR device may be increased with increasing length of the falling intensity edge and thus, increasing radiation power.

According to a further specific embodiment of the present invention, the readout electronics system is designed as an active or passive avalanche quenching circuit. The avalanche quenching circuit allows an activation of the SPAD cells for detecting photons by applying a voltage shortly prior to a breakdown voltage of the SPAD cells. Correspondingly, a SPAD cell that is triggered by photons may be reactivated by lowering the voltage applied to the SPAD cells down to the breakdown voltage or lower.

The breakdown voltage of the SPAD cells may be overcome, and a short-term current rise may be measured, as the result of receiving photons. Such a current rise may be measurable over a time period of 10 ns, for example, or may last for this long. Due to the design of the readout electronics system as an active or passive avalanche quenching circuit, the evaluation electronics system may be flexibly adapted to the requirements of the LIDAR device.

According to a further exemplary embodiment of the present invention, the SPAD cells of the detector are activated with a variably settable active time by the readout electronics system. Due to the DC coupling of the evaluation electronics system, the avalanche current of the particular SPAD cells of the detector is interrupted not by the necessarily brief active time of the readout electronics system, but, rather, by the slowly falling edge of the reflected and/or back-scattered beams, which must fall below a defined value. The SPAD cells are thus activated for receiving photons for the entire duration of a received beam pulse or at least during a partial duration. As a result of this measure, the SPAD cells may be exposed for a longer time, thereby increasing the dynamic range of the detector.

The DC coupling of the evaluation electronics system of the SPAD cells also enables a targeted control of the active time, and thus of the possible sensitivity duration per emitted beam pulse. The active time of the SPAD cells may be controlled by setting a time period during which the SPAD cells are acted on by a provided operating voltage that is slightly below their breakdown voltage.

According to a further aspect of the present invention, a LIDAR device for sampling a sampling range is provided. The LIDAR device includes at least one beam source for generating electromagnetic beams, at least one detector for receiving beams that are back-scattered and/or reflected from the sampling range, and a control unit that is connected to a readout electronics system.

The detector is designed as a SPAD array and is connected to the readout electronics system for operating the SPAD array, the control unit being configured to evaluate outputs of the readout electronics system and activate the at least one beam source.

According to one advantageous specific example embodiment of the LIDAR device, the evaluation electronics system is designed as a DC-coupled evaluation electronics system. Due to this measure, in contrast to an AC coupling, an extension of the so-called dead time of the SPAD cells by multiple photons received in succession by the SPAD cells may be prevented.

Furthermore, a complex activation of multiple laser sources may thus be dispensed with, and the evaluation electronics system of the SPAD cells may have a technically simpler design.

According to a further exemplary embodiment of the present invention, the at least one beam source is activatable by the control unit in such a way that the generated beams are emittable into the sampling range as beam pulses having a lengthened falling intensity edge. The use of multiple beam sources or a technically complex activation of a beam source for generating multiple beam pulses emitted in quick succession may thus be avoided in order to achieve an increase in the dynamic range.

Preferred exemplary embodiments of the present invention are explained in greater detail below with reference to greatly simplified schematic illustrations.

DETAILED DESCRIPTION OF EXAMPLE EMBODIMENTS

Figure 1:
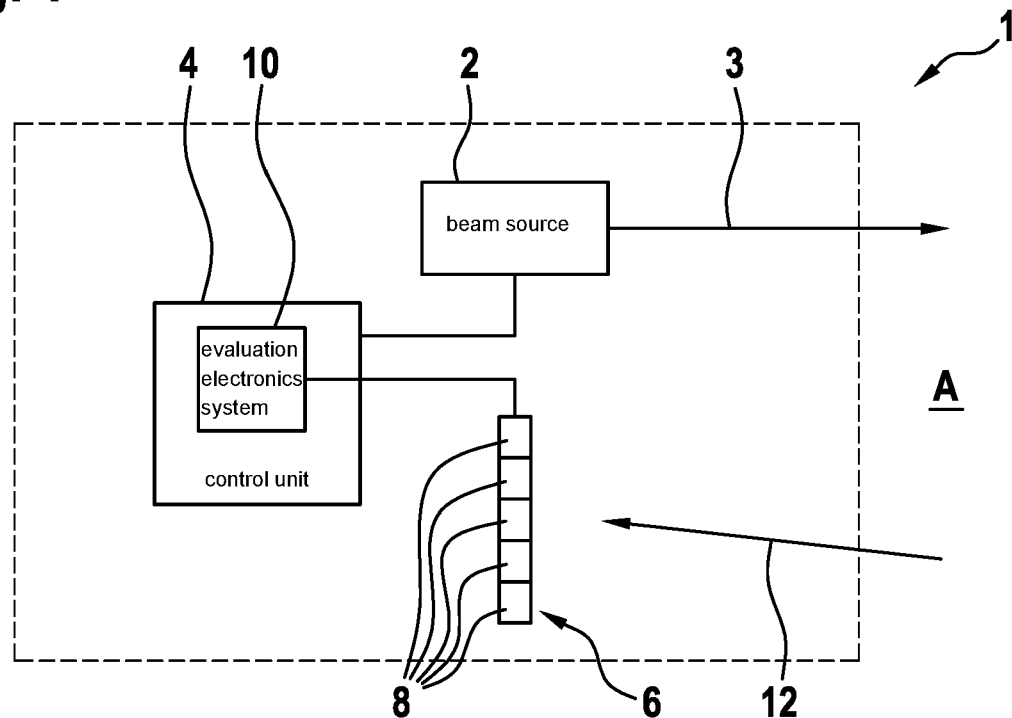
FIG. 1 shows a schematic illustration of a LIDAR device according to one specific embodiment of the present invention.

FIG. 1 shows a schematic illustration of a LIDAR device 1 according to one specific example embodiment. LIDAR device 1 includes a beam source 2 that is used for generating beams or beam pulses 3.

Beam source 2 is designed as a laser, and may be electrically activated by a control unit 4 and excited to generate beams 3. Beam source 2 may, for example, generate beams 3 having a wavelength in the infrared, visible, or ultraviolet wavelength range.

In addition, LIDAR device 1 includes a detector 6. Detector 6 includes a plurality of SPAD cells 8 that are connected to an evaluation electronics system 10. Evaluation electronics system 10 is preferably designed as a DC-coupled evaluation electronics system 10 in which, for example, the DC components of voltage U that is applied to SPAD cells 8 are not filtered out by a capacitor. SPAD cells 8 of detector 6 are flatly situated, and may receive or detect beams 12 that are reflected and/or back-scattered from sampling range A.

Received beams 12 and in particular photons of received beams 12 are detected in the form of brief current pulses by evaluation electronics system 10 and converted into digital measured data. This step may alternatively or additionally take place in conjunction with control unit 6.

Due to the use of a DC-coupled evaluation electronics system 10, not only is a so-called count triggered by a received photon, as with an AC-coupled evaluation electronics system, but due to a lengthened active time Z it is also possible to detect, for example, six or more counts per active time.

Figure 2:
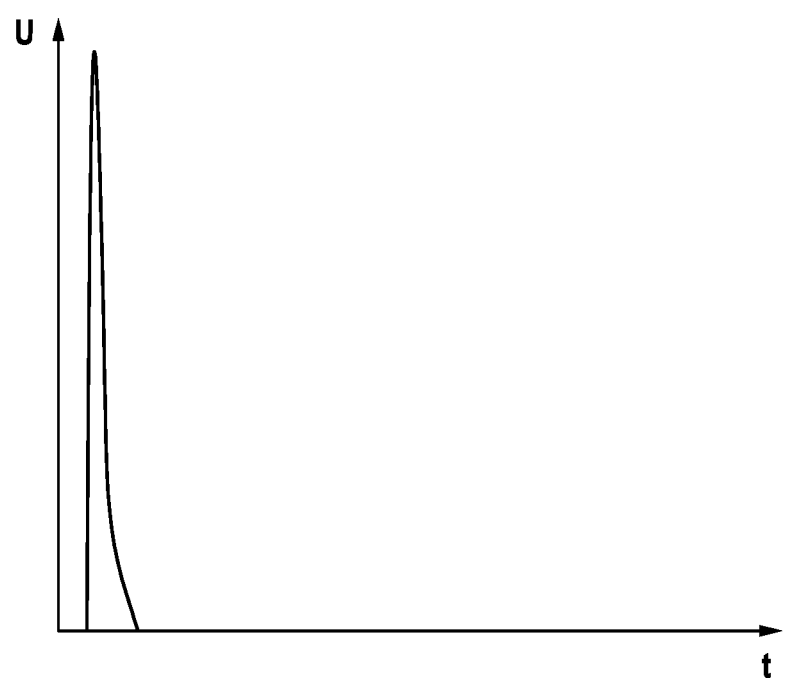
FIG. 2 shows a schematic diagram for illustrating a temporal voltage profile of an AC-coupled evaluation electronics system.

FIG. 2 illustrates by way of example voltage U, applied to SPAD cells 8, in an example of an AC-coupled evaluation electronics system. Voltage U required for activating SPAD cells 8 is present only briefly due to the oscillation of voltage U.

Figure 3:
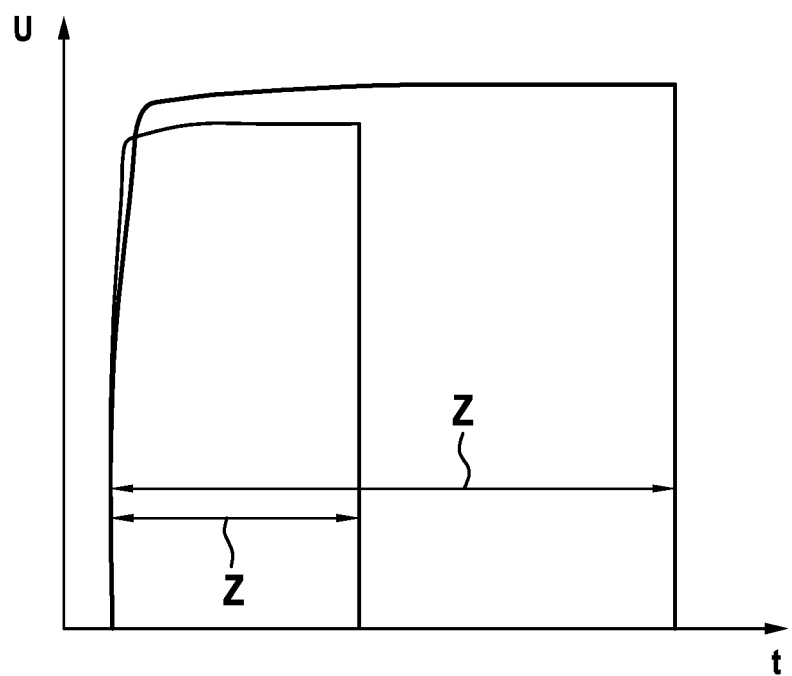
FIG. 3 shows a schematic diagram for illustrating a temporal voltage profile of a DC-coupled evaluation electronics system.

As an alternative, FIG. 3 shows a schematic diagram for illustrating a temporal voltage profile U of DC-coupled evaluation electronics system 10.

FIG. 3 illustrates two different voltage profiles U that may be applied to SPAD cells 8 to allow detection of photons of received beams 12. Voltage profiles U differ in particular in active time Z, which is variably settable by DC-coupled evaluation electronics system 10.

In DC-coupled evaluation electronics system 10 the dynamic range is expanded, since the length of the voltage signal or active time Z delivers the information concerning the level of intensity I of a received beam 12. In the AC coupling shown in FIG. 2, after a short time this is no longer possible.

Figure 4:
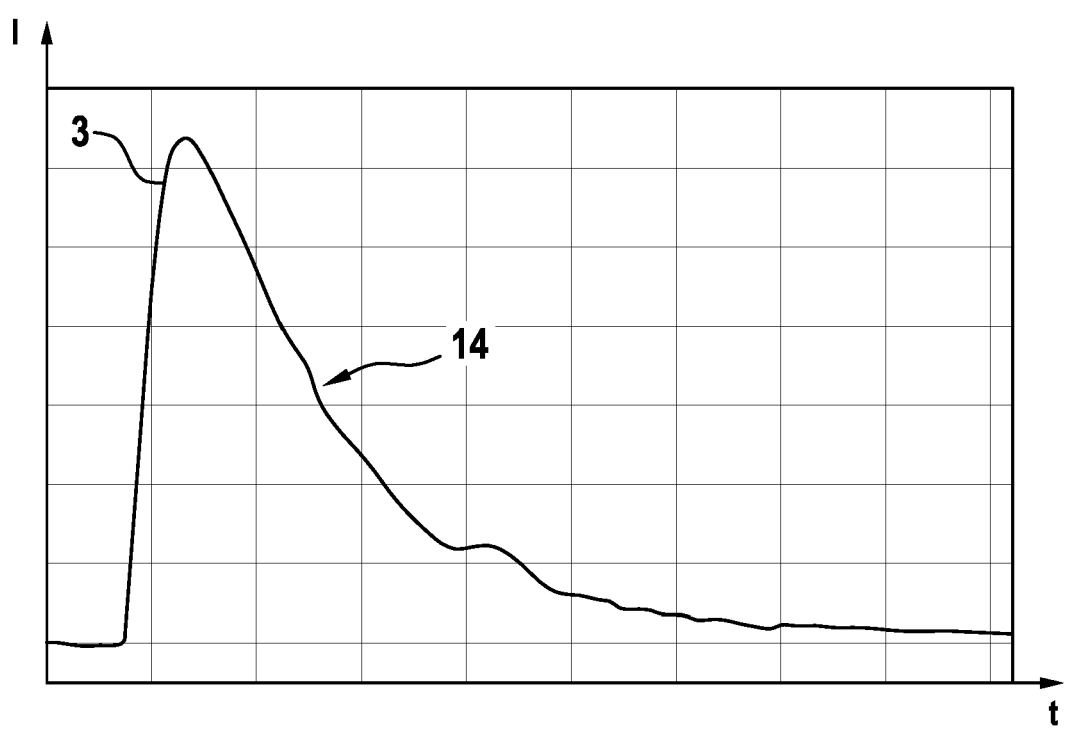
FIG. 4 shows a schematic diagram for illustrating an adapted intensity profile of a beam pulse.

FIG. 4 shows a schematic diagram for illustrating an adapted intensity profile I of a generated beam pulse 3. In contrast to a Gaussian beam pulse, illustrated intensity profile I of beam pulse 3 has a lengthened falling intensity edge 14. In the illustrated exemplary embodiment, falling intensity edge 14 has an exponentially falling design. For example, after a time t of 30 ns, falling intensity edge 14 may have a remaining intensity I of 1%.

Figure 5:
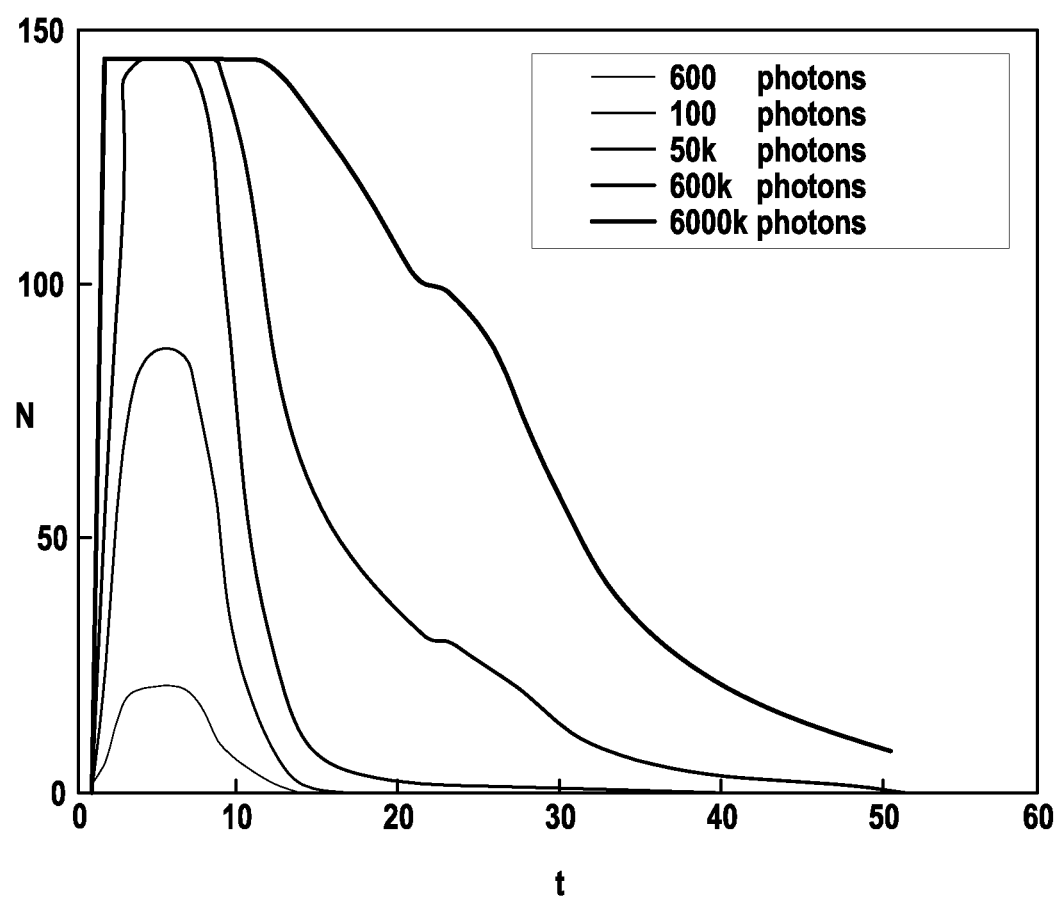
FIG. 5 shows a diagram with photons that are received or counted by the detector as a function of time.

FIG. 5 shows a diagram with photons that are received or counted by detector 6 as a function of time. In particular, a photon number N is illustrated as a function of time t. A larger photon number N may be detected with increasing time t that is used to detect received beams 12.

The dynamic range may be described as a range between a minimum detectable photon number N and a maximum detectable photon number N. Expanding the dynamic range allows improved distinguishability of detectable photon number N. For example, due to a larger dynamic range, a smaller detectable photon number N may be distinguished from a larger detectable photon number N. This relationship and the distinguishability are schematically illustrated in FIG. 5.

The numerical figures in FIG. 5 are provided as an example, and are used solely to illustrate differences.

What is claimed is:

1. A method for operating a LIDAR device by a control unit, the method comprising the following steps:
    emitting, by a beam source, at least one beam pulse into a sampling range; and
    receiving, by a detector, beams that are reflected and/or back-scattered from the sampling range, the detector including multiple single-photon avalanche diode (SPAD) cells, and received beams being converted into electrical counting pulses;
    wherein the at least one beam pulse is generated with a lengthened falling intensity edge, and the detector is read out by a DC-coupled readout electronics system.

2. The method as recited in claim 1, wherein the beam source is operated by the control unit in such a way that the at least one beam pulse is generated with an exponentially or quadratically or linearly falling intensity edge.

3. The method as recited in claim 1, wherein the readout electronics system is an active or passive avalanche quenching circuit.

4. The method as recited in claim 1, wherein the SPAD cells of the detector are activated with a variably settable active time by the readout electronics system.

5. A control unit for operating a LIDAR device, the control unit configured to:
    emit, by a beam source, at least one beam pulse into a sampling range; and
    receive, by a detector, beams that are reflected and/or back-scattered from the sampling range, the detector including multiple single-photon avalanche diode (SPAD) cells, and received beams being converted into electrical counting pulses;
    wherein the at least one beam pulse is generated with a lengthened falling intensity edge, and the detector is read out by a DC-coupled readout electronics system.

6. A LIDAR device for sampling a sampling range, comprising:
    at least one beam source configured to generate electromagnetic beams;
    at least one detector configured to receive beams that are back-scattered and/or reflected from the sampling range; and
    a control unit connected to a readout electronics system, the detector being a single-photon avalanche diode (SPAD) array and being connected to the readout electronics system for operating the SPAD array, the control unit being configured to evaluate outputs of the readout electronics system and activate the at least one beam source, wherein the readout electronics system is a DC-coupled readout electronics system, wherein the at least one beam source is activatable by the control unit in such a way that the generated beams are emitted into the sampling range as beam pulses having a lengthened falling intensity edge.

\* \* \* \* \*